United States Patent [19]

Caley, Jr. et al.

[11] Patent Number: 5,014,076

[45] Date of Patent: May 7, 1991

[54] PRINTER WITH HIGH FREQUENCY CHARGE CARRIER GENERATION

[75] Inventors: Wendell J. Caley, Jr., Quincy; William R. Buchan, Pocasset; Robert A. Moore, Waquoit, all of Mass.

[73] Assignee: Delphax Systems, Randolph, Mass.

[21] Appl. No.: 434,425

[22] Filed: Nov. 13, 1989

[51] Int. Cl.[5] ............................................ G01D 15/06

[52] U.S. Cl. ...................................... 346/159; 400/119

[58] Field of Search ......................... 400/119; 358/300; 346/154, 155-159, 153.1

[56] References Cited

U.S. PATENT DOCUMENTS

| | | | |
|---|---|---|---|
| 3,611,418 | 10/1971 | Uno et al. | 346/159 |
| 3,978,492 | 8/1976 | Simm | 346/74 J |
| 4,155,093 | 5/1979 | Fotland et al. | 346/159 |
| 4,160,257 | 7/1979 | Carrish | 346/159 |
| 4,562,447 | 12/1985 | Tarumi et al. | 346/159 |
| 4,628,227 | 12/1986 | Briere | 346/159 X |
| 4,658,275 | 4/1987 | Fujii et al. | 346/154 |
| 4,679,060 | 7/1987 | McCallum et al. | 346/159 |
| 4,697,196 | 9/1987 | Inaba et al. | 346/159 |
| 4,841,313 | 6/1989 | Weiner | 346/159 |
| 4,890,123 | 12/1989 | McCallum et al. | 346/159 |
| 4,918,468 | 4/1990 | Miekka et al. | 346/159 |

*Primary Examiner*—Donald A. Griffin

*Attorney, Agent, or Firm*—Lahive & Cockfield

[57] ABSTRACT

An electrode array forms a latent image by generating an electrical breakdown region and extracting an imagewise distribution of charge carriers which are accelerated toward a separate surface. Different control mechanisms, environments and ranges of operating parameters provide controlled amounts of charge delivered by electrons or ions for improved latent image production. High speed, high resolution and high uniformity of charge deposition are accomplished by different structures within the scope of the invention.

28 Claims, 7 Drawing Sheets

PRINTER WITH HIGH FREQUENCY CHARGE CARRIER GENERATION

The present invention relates to printing or creation of a visible image by the patterned or selective generation of charge carriers, and to the provision of these charge carriers to a surface to form a latent image, or to a display device for the electrical generation of a visible image. The latent image is converted to a visible image.

One example of a class of devices of this type is the device shown in U.S. Pat. No. 4,160,257 of Carrish. That patent shows a printhead assembly consisting of a regular array of electrode sets each of which is used to deposit a dot-like localized charge on a surface. Each set of the array includes a pair of electrodes which are separated by a dielectric. The electrodes are activated with an RF signal at a high voltage to define a charge breakdown or corona region of the dielectric wherein charged particles are periodically generated. One or more additional electrodes in each array function as extraction or focusing electrodes to gate or to direct particles of a particular sign (positive or negative) from the corona region toward the surface. The pair of electrodes of a set are spaced on opposing sides of an insulating dielectric sheet or body. This corona-generating portion of the electrode set lies at the bottom of a hole or perforation of another dielectric sheet or body, so that the ensemble of such holes and electrodes defines a pattern for forming the plural dots of charge on the imaging surface. By varying the sign, voltage potential and shape of signals provided to the additional electrodes, the energy and spatial distribution of extracted charge are varied.

Printheads of the foregoing type have been manufactured for about a decade, and appear in a variety of printing machines referred to generically as ionographic printers. In such machines, the charged particle generating structure of the printhead is positioned opposite a moving dielectric member or drum, and the various electrodes of each set of the array are activated as required to charge the member with a latent charge image. By selecting the relative potentials of the electrodes, the screen hole size, the electrode spacing and other parameters, the size and total charge of each latent image charge dot delivered to the drum is controlled.

By way of example, characteristic operating parameters may involve applying a 2000 to 2500 volt peak to peak RF signal burst of 1–3 MHz frequency to the corona-generating electrodes, applying various gating, bias or accelerating voltages in the range of 200–600 volts to the outer electrodes and/or the latent image receiving member, and operating the printhead with its electrode structure spaced 0.1 to 0.5 mm from the surface of the latent image receiving member. The cavity or region where the corona is generated for one "hole" or set of electrodes may have a depth of approximately 0.05–0.3 mm below the nearest extraction/gating/focusing electrode of the set.

Existing printheads of the aforesaid type generally operate in an ambient gaseous environment, and each set of electrodes, constituting a "hole", directs its charged particles to the drum through ambient air. Collisions of the charged particles with surrounding gases and scattering thus limit the printhead-drum spacing to less than several millimeters, to avoid loss of energy and dot resolution. Moreover, because of the relatively large inertia of ionized air molecules, it has heretofore been assumed that the transit time of an electrostatically-accelerated ion through the electrode/hole structure sets a lower limit on the period of an RF signal which may be used to generate the corona from which particles are extracted. If, for example, negative ions are not accelerated out of the hole before the sign of the RF signal changes, they will be quickly attracted to an RF electrode when it reverses sign, rather than directed toward the imaging drum, and fewer ions will escape from the hole over the RF electrode structure.

This effect of trapping ions within the electrode structure has generally been considered to impose an extreme upper limit of approximately 5 MHz on the RF frequency which may be used to generate a corona for a controlled electrode array printhead structure as described. See, for example, the statement to this effect concerning frequency limits expressed in U.S. Pat. No. 4,697,196, at column 5. The upper frequency limit is an important characteristic for the design of printheads of the above type, since the duration of the basic interval during which charged particles are produced is directly related to the time required to print a full page, and this affects the attainable printing speeds. For a given speed, it also determines the number of different levels of charge which may be delivered to the drum. The latter attribute is important where precise charge quantization may be desired for tonal or multicolor printing.

SUMMARY OF THE INVENTION

Applicant has discovered that contrary to existing beliefs, a printhead structure as described does not simply generate positive or negative ions, but rather, when operated to produce negative charge carriers, produces a stream of accelerated electrons as the primary charge carriers. These primary charge carriers can be dependably generated and extracted at frequencies extending substantially above the known range of printhead control parameters. The electrons reach the dielectric drum with transit time orders of magnitude faster than the ionic charge and are subject to electrostatic control, so they can therefore achieve higher image rates with increased resolution.

By using a high frequency RF signal to generate a charge breakdown region applicant achieves a more uniform generation of charge carriers, and a greater range of accurately controlled deposited charge in the latent image. Moreover, applicant has measured the relative contributions of ionic and electronic charge letters in the printhead output, and has discovered different control mechanisms, environments and ranges of operating parameters whereby predictable and controlled amounts of charge of each type may be dependably produced for improved latent image production. High speed, high resolution, and high uniformity printing are accomplished by different structures within the scope of the invention.

DETAILED DESCRIPTION

Figure 1:
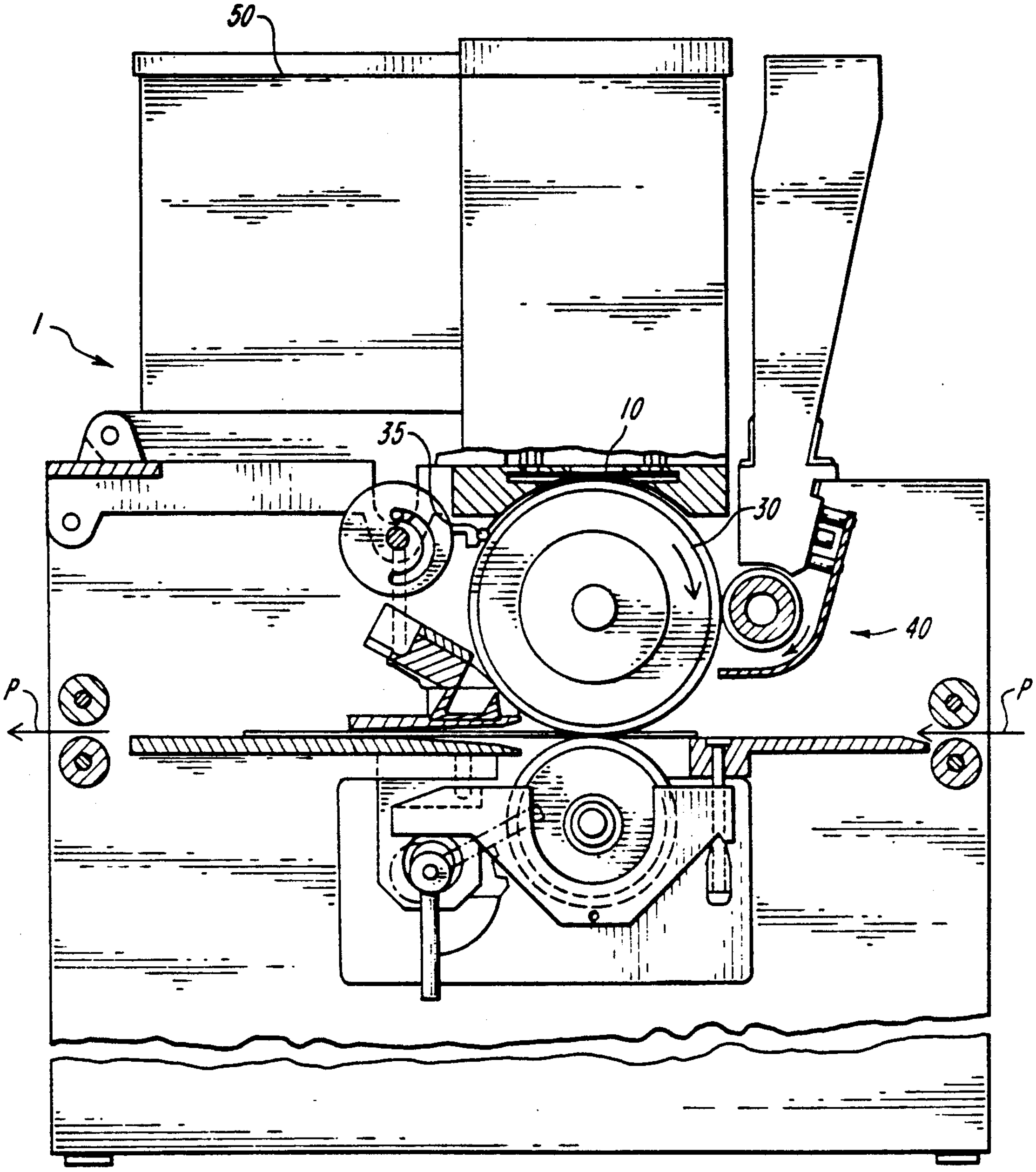
FIG. 1 shows a prior art ionographic printing apparatus;.

FIG. 1 shows by way of illustration an ionographic printing apparatus 1 having an overall structure representative of prior art machines of this type. A printhead 10 forms a latent charge image on a rotating dielectric drum 30, and a toner assembly 40 provides toner which selectively attaches to charged areas of the drum. Paper passes along a paper feed path P and contacts the drum 30 to receive the toned image from the drum. Printhead power and control circuitry actuates the printhead electrodes in a controlled sequence to provide the correct two-dimensional distribution of charge on the surface of the rotating drum. The actuation of the printhead to charge the drum is referred to as the writing operation. The application of toner to the charged drum and the transfer of toner from the drum to a sheet medium are referred to as the toning and printing operations, respectively.

In addition to the above structure, one or more corona or erase rods, or other discharge structure is provided for neutralizing residual charge on the drum after the printing operation and prior to the next writing operation.

It will be understood that within a broad range, equivalent subassemblies of the illustrated printer may be varied. For example the drum may be replaced by a moving belt, the relative positions of paper path, toner reservoir and printhead may be varied, and the use of a ground plane or spaced electrode structure on the side of a belt opposed to the printhead may be employed. Other aspects of the construction may be routinely adapted from similar constructions used in photocopiers or the like. For purposes of this disclosure, only the printhead structure and its location need be considered in detail.

The printhead 10 is an elongate multi-electrode structure which defines an array of "holes" each of which, when its electrodes are activated, generates and directs toward the dielectric member 30 a burst of charge carriers, e.g. ions, to form a pointwise accumulation of charge on the member 30 constituting a latent image. In practice these "holes" are arranged in a panel of many adjacent slanted segments, or fingers, each finger consisting of many, e.g. ten to twenty, holes. This configuration allows for a great number of holes to be spaced in an array with a small lateral offset, and thus provides a high resolution. The interleaving of the resultant charge image smooths non-uniformities which might otherwise appear in the latent image.

Figure 2:
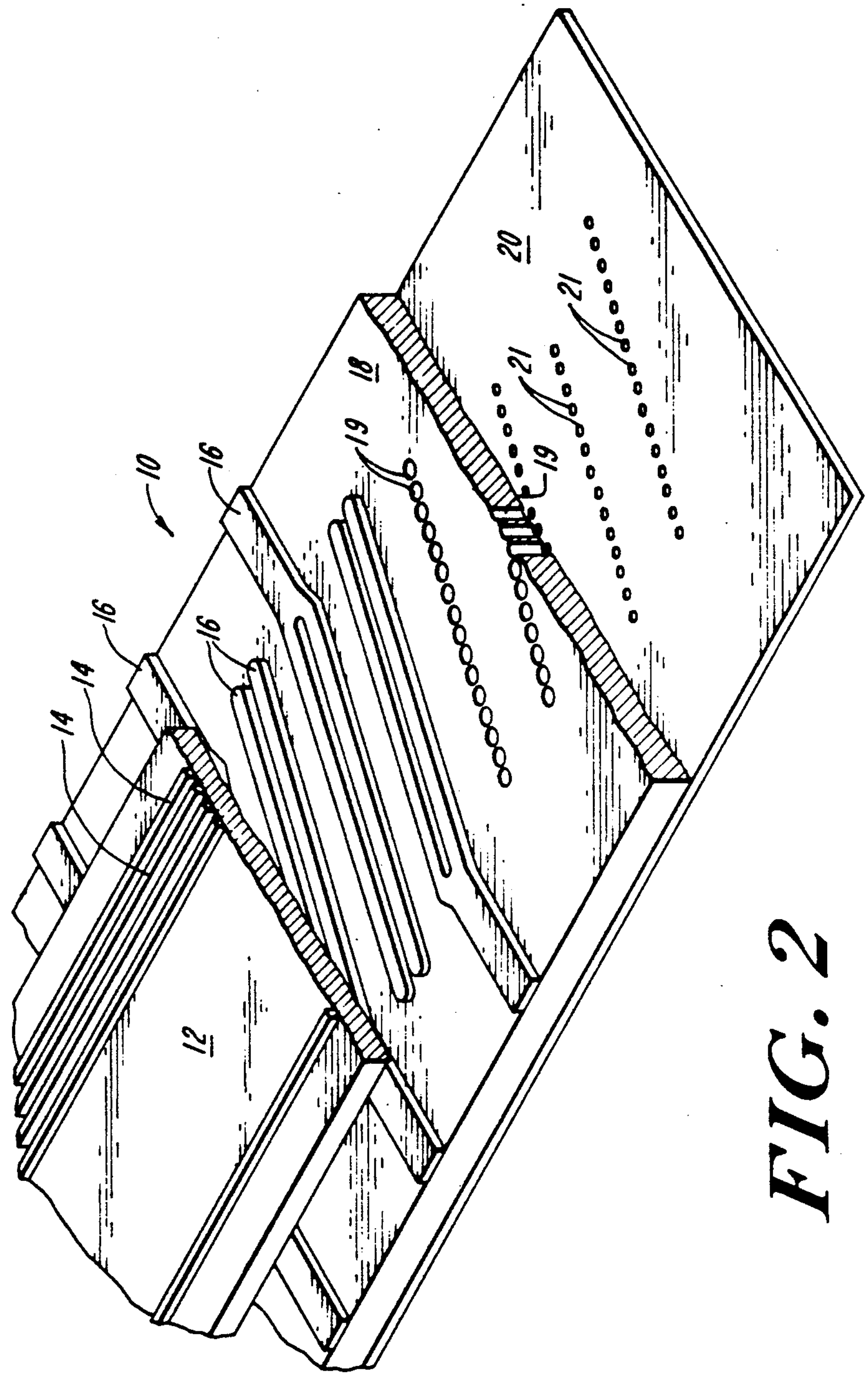
FIGS. 2 and 3 show a partial cutaway and a cross-sectional view, respectively, of a prior art printhead as used in the device of FIG. 1.

FIG. 2 is an exploded perspective view of one prior art such printhead 10, showing the overall construction as well as the detailed structure of each hole.

Printhead 10 has a dielectric sheet 12, for example, a layer of mica twenty microns thick, with first electrodes 14 attached to one side thereof, and second electrodes 16 attached to the other side thereof. The electrodes 16, called finger electrodes, are oriented to cross electrodes 14. In operation, a high voltage RF signal is applied between a pair of crossing electrodes 14, 16 to create a corona or breakdown region extending between an edge of electrode 16 and the dielectric sheet 12, and charge carriers are extracted from the breakdown region. In the illustrated device a second dielectric or insulating layer 18 and a third electrode structure 20 are arranged to extract the charge carriers. Layer 18 has a plurality of passages 19 extending therethrough in alignment with the crossing points of corresponding pairs of electrodes 14, 16. The third electrode structure 20 may be a single conductive sheet having an aperture 21 aligned over each passage 19. By the application of a selected voltage difference between the third electrode 20 and the dielectric drum 30 (FIG. 1), and by applying a lesser electric potential difference between electrodes 16, 20, charged particles of one polarity formed in the electrical breakdown region at the crossing of electrodes 14, 16 are gated through the passages 19, 21 and directed at the dielectric member or drum 30. The charged particles of appropriate polarity are inhibited from passing out of passage 19, depending upon the sign of their charge, so that the printhead emits either positive or negative charge carriers, depending on its electrode operating potentials.

Figure 3:
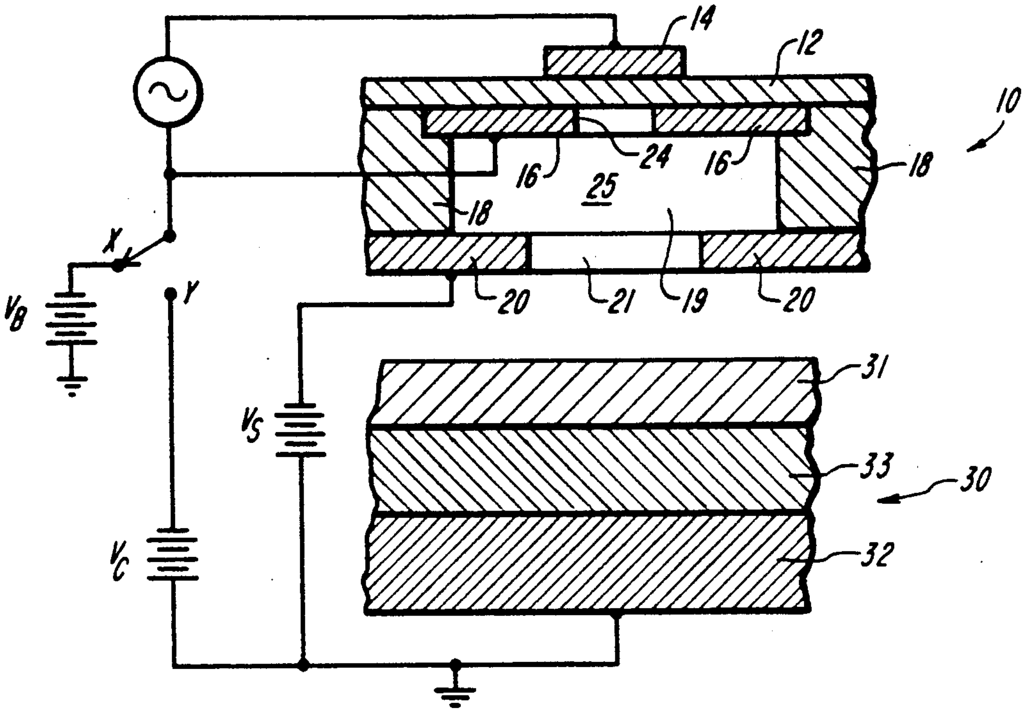

FIG. 3 shows a somewhat schematic cross-sectional view of the electrode structure constituting one hole of the printhead, with identical numerals used to indicate the identical elements shown in FIG. 2. As shown in this view, the application of a high voltage RF burst between electrodes 16, 14 causes a charge breakdown region 24 to form between the dielectric 12 and electrode 16, from which electric charge carriers are accelerated through cavity 25 and directed to the drum or other charge-image receiving member 30. Member 30 is shown as comprised of a dielectric layer 31, a conductive layer 32 and an intermediate layer 33. Persons familiar with the range of constructions of latent-imaging members will understand that layer 33 may comprise photoconductive or semiconducting material, or may comprise material selected to have a certain mechanical property; and further that one or more of layers 31, 32, 33 may be included in a belt structure, and one or more of layers 32, 33 may be included in a separate electrode or support structure. Furthermore, the electrode structure of the printhead may include additional electrodes, or separately controlled electrodes 20 in place of the illustrated sheet third electrode structure 20.

Figure 4:
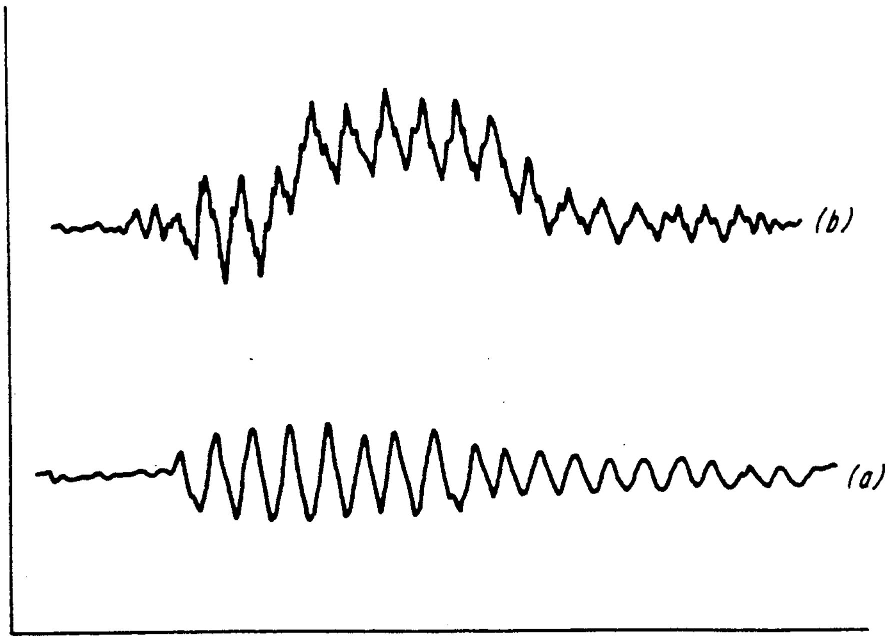
FIG. 4 shows representative signals applied to the printhead for generating positive charge carriers and shows the positive current delivered to the drum.

In order to elucidate the mechanisms of charge generation and transport in such a prior art ionographic printhead, applicant has now undertaken a series of measurements of current produced by a single hole under varying operating conditions. FIG. 4 shows the RF excitation frequency applied to a prior art printhead, and the charge current accelerated toward the latent image member. The lower trace (a) shows a burst of five to seven oscillations of a 1 MHz RF signal applied to electrodes 14,16. The upper trace (b) shows the charge current synchronously detected at a distance of 0.25 mm from the screen electrode 20, which corresponds to the nominal location of the drum surface. The measurements were taken with the electrodes 16, 20 biased such that only positively-charged carriers were emitted from the electrode array. Computer integration of the trace (b) to plot the delivered charge, and comparative measurements made at probe spacings of between 0.25 and 0.75 millimeters revealed a transit time of about 1.4 microseconds per 0.25 millimeters of printhead-drum spacing. Trace (b) thus corresponds quite closely to the expected trace for a stream of positive ions, generated synchronously with the high voltage RF breakdown signal and accelerated toward the drum 30.

According to a principal aspect of applicant's discovery, the negative charge carriers accelerated from region 24 through cavity 25 toward the member 30 when the screen electrode 20 is at negative potential with respect to the drum electrode structure consist primarily of electrons rather than negative ions as previously believed. These charge carriers are dependably generated using high dielectric excitation frequencies, and have a precisely determine time of generation and short transit time to the drum.

Based on this discovery, applicant has devised systems for selectively printing with ions or with electrons by varying the environment and operating parameters of the printhead. The types of charge carrier, the amount of charge and the uniformity of charge deposition are controlled with precision. A printing system operated to produce electrons as the charge carriers may operate with substantially increased speed.

Figure 5:
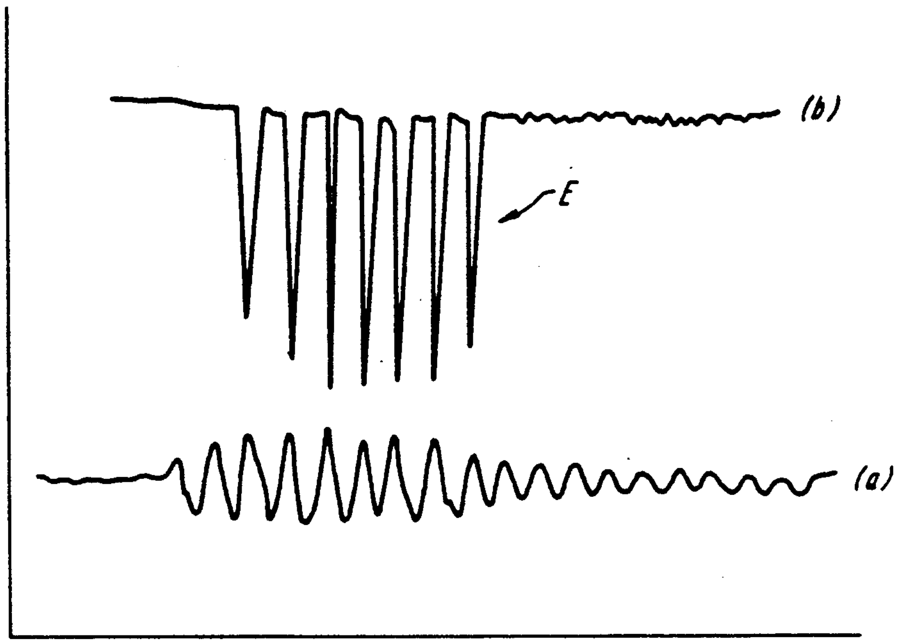
FIGS. 5, 5A and 5B show graphs of negative current carried by negative charge carriers with a printhead in accordance with the present invention.

FIG. 5 shows a charge current plot corresponding to that of FIG. 4 of the same printhead with the screen electrode 20 biased to deposit negative charge carriers. The RF excitation burst (a) is identical to that of FIG. 4. However, the charge current trace (b), which appears on a time scale to resolve a 10 nsec. signal, consists primarily of a number of discrete spikes correlated with individual excursion of the RF burst.

Figure 5A:
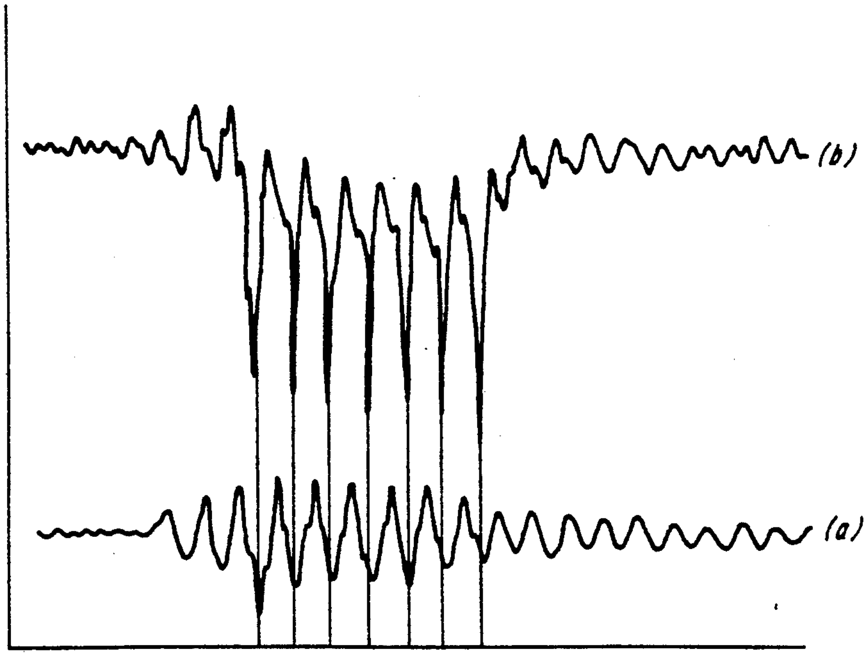

FIG. 5A shows the negative current trace amplified by a factor of about twenty-five. On this scale, the individual spikes go off the screen, but a slower low amplitude negative current signal hump also becomes visible. The unamplified RF trace (a) also appears in the Figure to illustrate the burst envelope. By undertaking numerical analysis of the charge current curves, applicant was able to resolve curve (b) of FIG. 5A into two curves, which are plotted as curves (c) and (d) in FIG. 5B. They correspond to the negative spikes (c) and the slower hump (d), and are indicated by arrows E and N, respectively.

In order to better understand the current transport mechanisms, a detailed analysis of the time-of-arrival of the charge current as well as the total delivered charge was carried out at different printhead to probe spacings, as was done for the positive ion case. These measurements revealed that the charge currents E and N, which appeared to involve different mechanisms, involved carriers with mobilities that differed by three orders of magnitude, and that the relative proportions of E-type and N-type delivered charge can be varied by controlling charge generation, deposition and environmental factors as set forth below.

First, applicant observed that at the nominal 0.25 millimeter printhead to probe spacing, corresponding to a typical prior art print cartridge and drum spacing, the E-type carriers had an apparent transit time on the order of ten nanoseconds, whereas the N-type carriers had a transit time on the order of one microsecond. These "fast" and "slow" charge carriers exhibited similar respective mobilities at greater spacings, with the mobility and charge drop-off properties of the N-type carriers corresponding closely to the known properties of negative ions. The ratio of total E/N delivered charge was about four or five to one, with the relative amount of E charge dropping with increasing spacing from the electrode structure.

Because the transit time of the E-type carriers was orders of magnitude faster then the negative ions which have been believed to constitute the sole output of an ionographic printhead operated to produce negative charge, and yet was well above the propagation time for electromagnetic effects, the carriers responsible for this major component of negative current were identified as electrons. Applicant further reasoned that these E-type carriers will persist at RF inducing frequencies well above the several-megaherz ceiling of prior art printers.

Accordingly, in one experiment, a printhead electrode structure was operated with a special driver using RF inducer electrode signals of 2.03, 4.45, 9.90, 14.5 MHz and higher signals. In each case the E-type charge carriers were dependably generated, without substantial drop-off in magnitude, so that each spike delivered approximately the same amount of net charge, independent of the RF frequency. In one such experiment, the charge from a single spike was measured with the electrodes operating in an atmosphere of dry nitrogen, and was found to amount to five picoCoulombs. This charge is sufficient for latent image formation of a six mil dot.

Figure 5B:
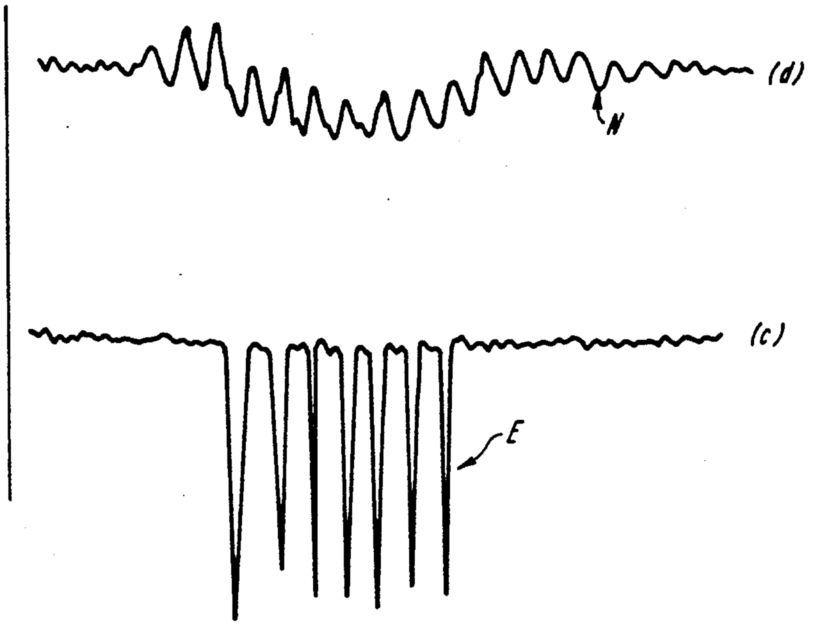
Figure 7:
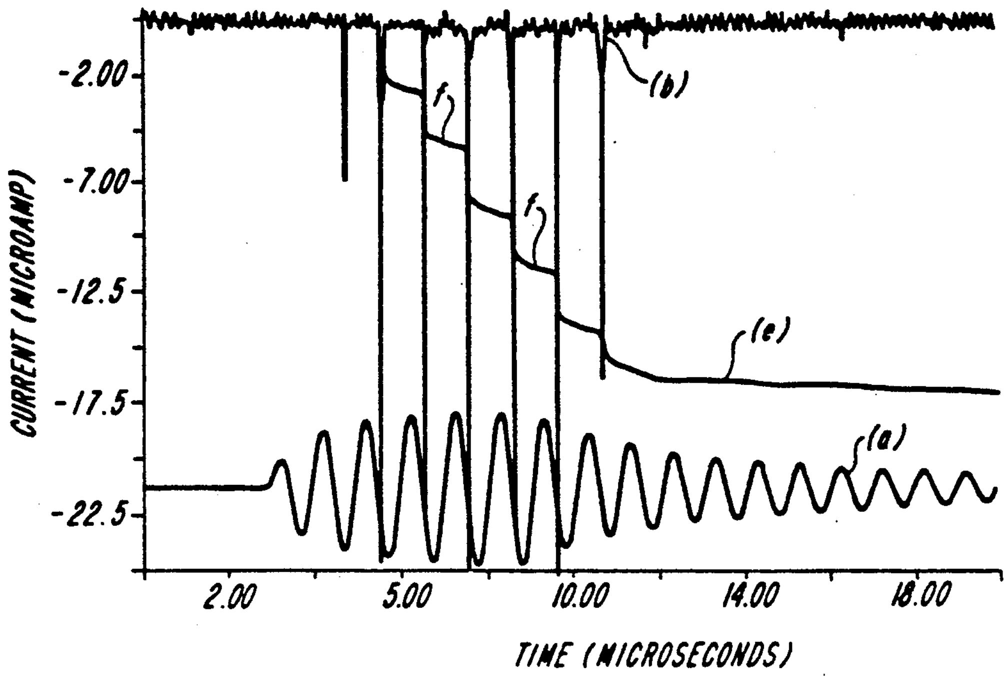
FIG. 7 shows the delivered charge with printhead operation as depicted in FIGS. 5–5B.

FIG. 7 shows a composite graph, similar to FIGS. 5–5B, in which the one megaherz RF burst (a), the negative current (b) and the integrated delivered charge (e) are all plotted on the same time scale. The delivered charge (e) is essentially a step function, with one quantum of charge delivered by each electron spike (f); each step of the function is fairly flat, and rises only slightly due to the small amount of ionic charge which starts to appear after the first microsecond, while the jump between steps, corresponding to the total charge of each electron spike, is approximately one picoCoulomb. The charge levels off at approximately 6.7 picoCoulombs for six electron spikes. As noted above, in other experiments, a charge of about five picoCoulombs was achieved with a single electron spike.

During these tests, applicant further discovered that the irregularities or misfires in a printhead, which result when a given RF cycle of the burst applied to electrodes 14,16 fails to generate any charge carriers, was highly dependent on "charge seeding". That is, during the first one or two cycles of RF signal there is a substantial probability of a misfire, whereas following one or two full RF cycles of charge generation, there is a substantial certainty that each succeeding RF cycle will generate charge carriers which are effectively emitted from the printhead. Further, as the interval between successive cycles decreased, the likelihood of a successful firing increased.

With prior art printheads operating with RF signal bursts under 3 MHz, it has only been practical to employ an RF burst of 5–15 cycles to activate each hole of the printhead, consistent with the amount of time available to print an entire page, the number of dots required for a page, and the actuation and multiplexing of the RF drive lines and finger electrodes. However, by operating at an RF frequency above 5 MHz applicant is able to deliver a consistent level of charge to the print drum while still attaining resolution of 300 DPI or higher and print speeds of sixty to well over one hundred pages per minute. Indeed, although the relatively slow ion mobilities would result in image blurring at speeds several hundred pages per minute, applicant found that it is possible to suppress the ionic charge carriers and operate with only electrons. In that case, much greater print speeds are attainable. In fact, if a printhead is designed to fire dependably with a single electron spike, the ten nanosecond electron transit time would correspond to a maximum printing speed of about sixty thousand pages per minute.

Several control methods have been found effective to enhance the uniformity of firing. In one method, the driver provides n complete RF cycles to activate each dot, and controls the back bias (i.e., the voltage of the finger electrode relative to the screen when the finger is "off") to effectively inhibit charge transfer during the first several cycles of each RF burst, then changes the bias to pass the negative carriers. This assures that of the n RF cycles, substantially all of $(n-2)$ cycles are "active" cycles, without misfires. Finally, another method is implemented by applying a short RF burst to electrodes 14, 16 in between successive activations of the electrode array. Thus, rather than allowing a typical 240 microsecond interval between successive activations of the electrode array of one "hole", applicant found that he could prevent the dielectric 12 from relaxing, and thus "precondition" the electrode assembly to make misfires less likely, by actuating at least the RF electrode assembly at 100 microsecond intervals or more frequently.

Further, applicant found that the actual amount of delivered charge per RF cycle was relatively constant over the range of frequencies examined. Thus a burst of twelve RF cycles at 1 MHz delivered about the same total charge as a burst of twelve RF cycles at 10 MHz. The charge suffered significant attenuation of the "slow" N-type carriers but only minor variation in the "fast" or E-type majority carriers. Since the N-type carriers constitute a minor portion of the charge carriers, the printhead operates dependably at the higher frequency well over 5 MHZ.

While, as noted above, the fast or E-type carriers identified as free electrons were undetected but still present charge carriers in prior art printheads, the realization of their role in conventional "negative ion" printing has lead applicant to several improvements in the speed, resolution and uniformity of printing using methods according to the present invention to vary the printhead operating parameters and environment.

Figure 6:
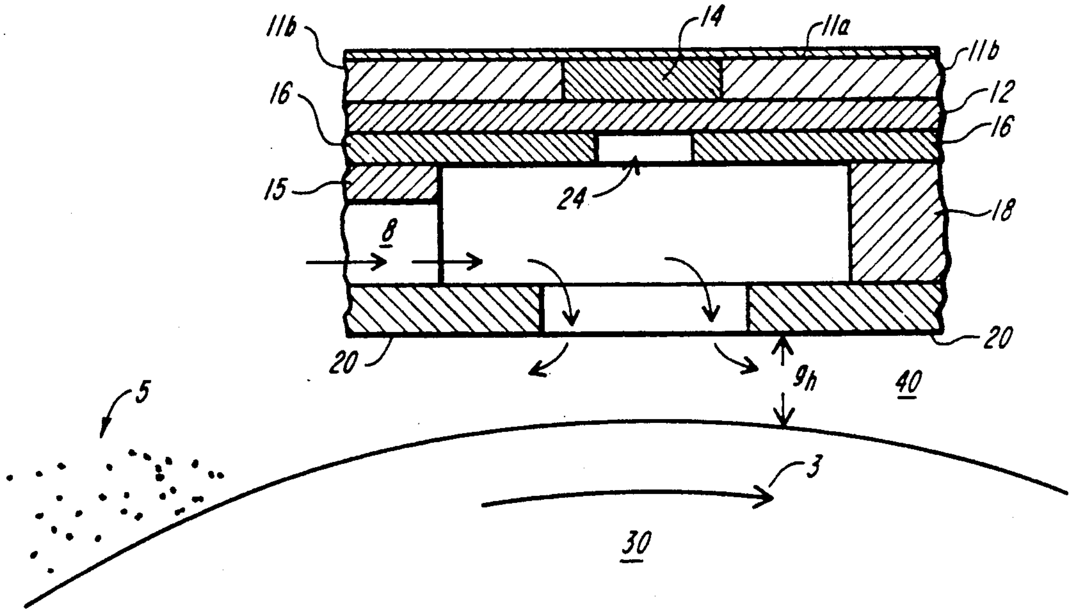
FIG. 6 illustrates printhead construction for different practices of the invention.

Specifically, applicant found that by using a specially constructed printhead which allowed control of the gas in the electrode cavity and in the gap 40, as shown in FIG. 6, the type of charge carrier could be controlled.

FIG. 6 shows one electrode array of a special gas flow printhead, in which elements corresponding to the printhead of FIG. 3 are disposed and numbered identically for ease of understanding. Additional sealing or insulating layers 11*a*, 11*b* appear in this view owing to the specific multilayer construction techniques employed in fabricating the printhead, as does a solder mask layer 15, but these may be ignored for purposes of understanding the invention. A gas manifold 8 connects to each hole and provides a controlled flow of gas, indicated by the arrows, to control the type of gas present in the electrode cavity and in the charge breakdown region 24. For higher gas flow rates, the gas displaces ambient air, denoted by 5, outside the cavity and thus also controls the composition of gas in the printhead/drum gap 40. The surface of the dielectric imaging member 30 is illustrated as a curved drum, with its direction of travel shown by arrow 3. The curvature of the drum is exaggerated to emphasize that, for a sequence of ten or so holes arranged along the direction of travel, the gap spacing $g_h$ for each hole h may vary by fifty percent or more at the holes located at the edges of the printhead along the direction of drum rotation.

Returning now to the discussion of charge carrier generation and charge delivery to the drum using a gas manifold printhead as described, applicant has made a number of discoveries.

Specifically by providing a flow of a non-electron attaching gas, such as dry nitrogen, through the assembly, the negative ion charge carriers responsible for trace (d) of FIG. 5B are essentially inhibited, and the ampitude of the trace (c) of FIG. 5B which is due to E-type or electron carriers increases. Thus, a printhead provided with nitrogen flow and biased to operate in a negative carrier mode will produce an array of microdot electron beams as its output. According to one aspect of the invention, a printhead operated in this manner is spaced sufficiently close to the drum and provided with a sufficient flow of nitrogen so that negligible ionization of air occurs in gap 40, and is operated as a high speed, high resolution printer. Specifically, since the electron carriers have an essentially instantaneous transit time, by operating with an RF burst of under approximately one microsecond duration, blurring of a dot image is avoided even for very fast printing speeds over several sheets per second. Moreover, a form of image blurring due to circumferential airflow in the drum-printhead gap should not affect electrons, so this cause of image degradation is also removed. Such operation is referred to herein as E-type operation.

In another aspect of the invention, the output of the printhead is controlled to produce predominantly negative ions by introduction of an electron attaching gas, such as oxygen, to absorb the electrons. Conversion of E-type charge carriers into N-type charge carriers in this manner provides more uniform charge deposition. This operation is referred to herein as N-type operation.

Figure 8A:
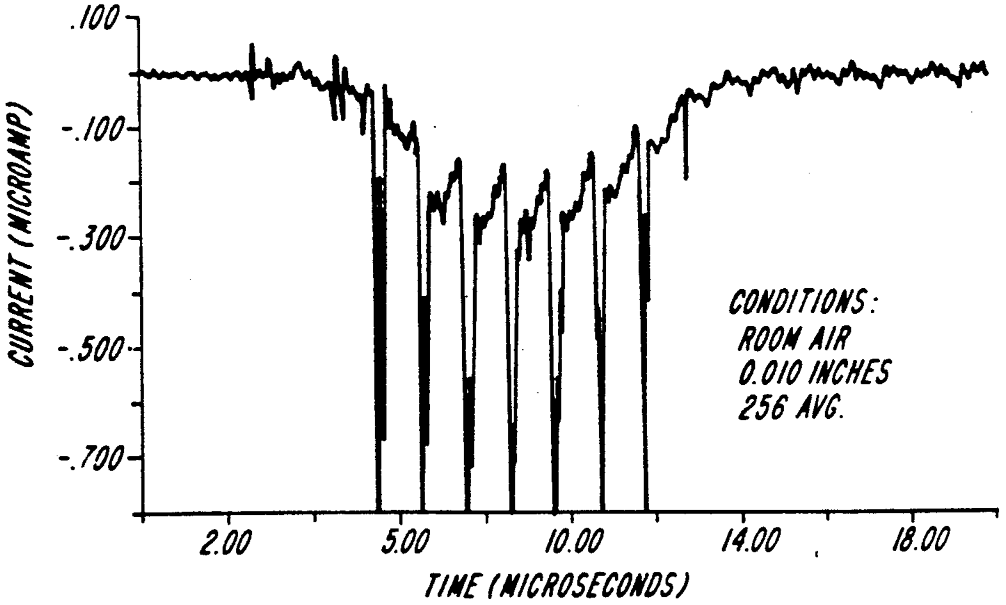
FIGS. 8A–8C show variations in type of charge carrier with different gaseous environments.
Figure 8B:
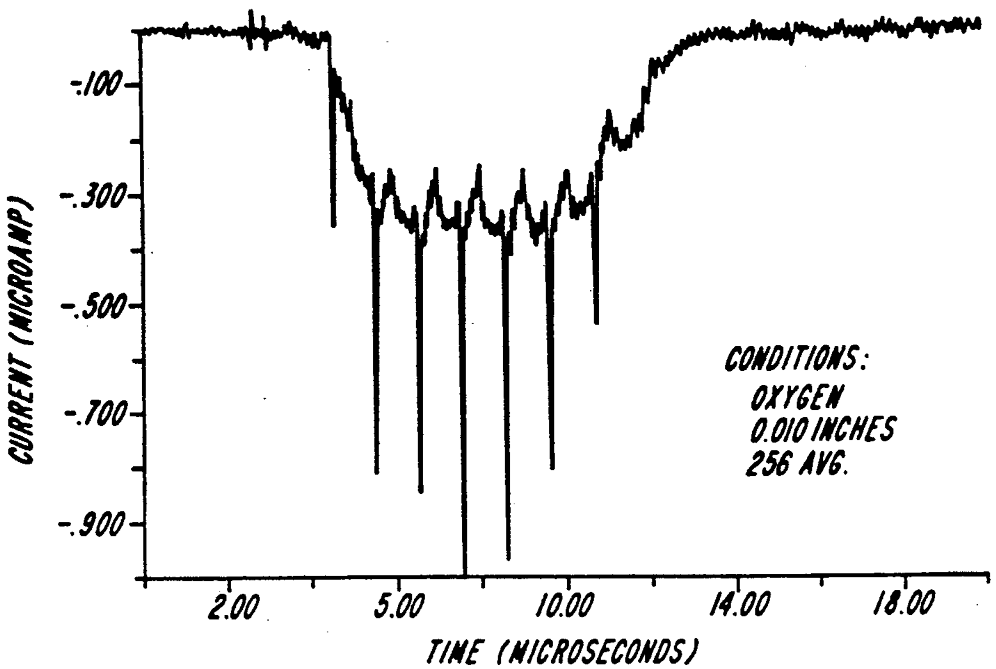
Figure 8C:
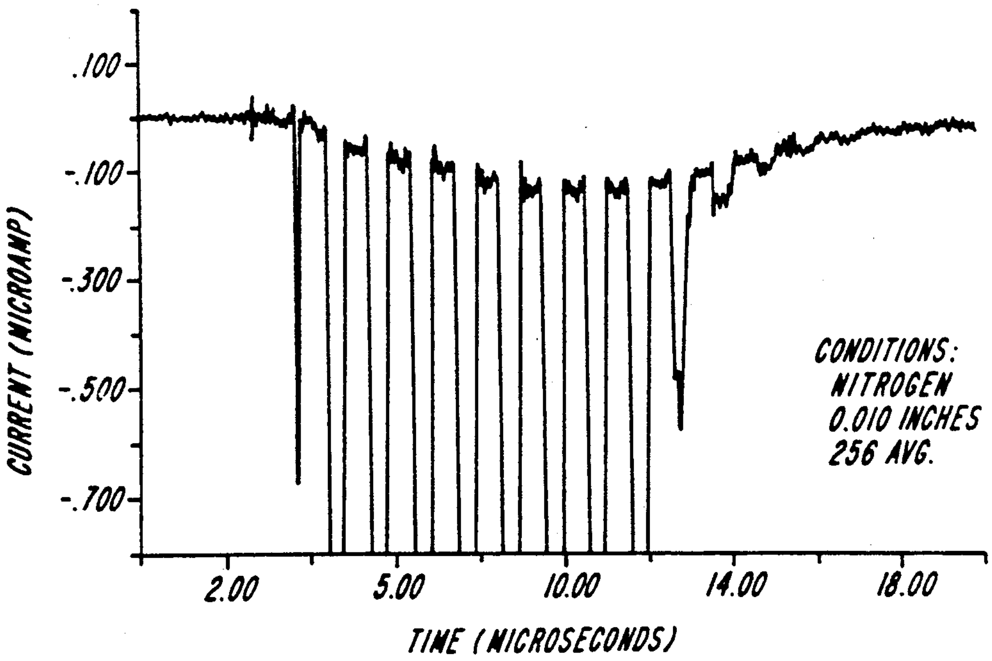

FIGS. 8A-8C show negative current traces detected at 0.25 millimeters from the screen under different gas ambient operating conditions. All are taken at high gain to make the ionic hump visible. All figures are referenced to the timing of an RF signal as shown in FIG. 7, curve (a). In FIG. 8A, the normal operation in room air is shown. The ionic component, after one or two microseconds, rises to a current level between two and three hundred microamperes, then falls off. When the ambient gas is changed to an electron attaching gas each as oxygen, as illustrated in FIG. 8B, the amplitude of the ionic component rises more quickly, and reaches a higher current between three and four hundred microamperes. Simultaneously, the peak electron current is lowered. The timing and shape of the rising edge of the ion current indicates that ions are formed throughout the transit path between the drum and printhead by electron attachment. Thus, the early ions arrive before any of the ions formed in the electrode cavity arrive, and a higher, more uniform ionic charge is generated. Finally, in FIG. 8C, the effect of a nitrogen atmosphere on ionic charge is graphically shown.

Conventionally, one would not think to use nitrogen in a printhead operated as a negative ion printer, because nitrogen does not form negative ions. As shown in FIG. 8C, however, the provision of a nitrogen ambient has the effect that the ionic component of the charge current is essentially inhibited, averaging under one hundred microamperes, while the electron spikes appear enhanced.

Thus, the invention provides a method of selectively enhancing or inhibiting the production of either ions or electrons in a printhead operated to print with negative charge carriers.

In another aspect of the invention, different modifications are made to the printhead or surrounding structures to selectively affect one of the two negative charge carriers. In different embodiments, the electron charge carriers are removed by providing an electrostatic deflection or blocking potential via an additional electrode, or the negative ions are removed by providing a laterally directed stream of gas at the printhead output, which deflects the ions so that only the electron carriers reach the print member.

In the first of these modifications, since the electrons have a greater mobility than the ions, an electostatic deflection or blocking potential is applied for a brief interval with a phase delay corresponding to the timing of electron passage by the screen electrode, without affecting the ionic N-carrier component. Applicant has found that the electrons are generated in the RF breakdown region of the printhead during a brief avalanche period in the negative going portion of each RF cycle, the avalanche being terminated in a few nanoseconds by the rapid charging of the dielectric surface which covers the RF electrode. Thus, by applying an electrostatic blocking signal to the electrodes for a brief interval at this time synchronized with a portion of the RF waveform, the electrons may be blocked while the slower moving ions remain unaffected. In other embodiments, a magnetic field may be applied to deflect electrons, to the same effect.

In effecting any of these changes, it is desirable to achieve a net delivered charge to the latent imaging member 30 which is on the order of five picocoulombs per dot for a six mil dot, or about 1.25 picocoulombs per dot for a three mil dot. When suppressing ionic carriers and operating in the E-type mode to print with the majority electron type carrier, an appropriate control process uses a number n of RF breakdown cycles which results in the correct delivered charge, and the frequency is selected to satisfy the combined requirements of speed dictated by multiplying the resolution in dots per inch, and speed, in pages per second, for the printhead structure employed. When operating in the N-type mode with ionic charge, uniformity of charge density may be optimized by conversion of electron charge to ionic charge using electron attaching gases. Furthermore, if such gases are applied outside the electrode cavity, rather than through the cavity as illustrated in FIG. 6, the conversion to ionic carriers will occur primarily outside the printhead. In that case, the created ions will be relatively unaffected by RF signal reversals, and the dropoff in ionic charge generating efficiency at higher frequencies, which characterizes prior art printheads, may be avoided. Thus, the invention further includes control methods involving conversion of charge carrier type outside the printhead to achieve a desired level of charge delivery at a desired operating speed.

Several further points follow from applicant's measurements and have implications for printer design. First, because the main charge transit time (4 nSec vs. 1 $\mu$Sec) and transit time spread (<20 nSec vs. 2-3 $\mu$Sec) of electrons are so much faster than for ions, a dielectric member for electron printing may be selected with a latent image time constant under about five nanoseconds. Second, because the slow ionic charge can be suppressed, the presence of residual space charge in the printhead-drum gap is reduced leading to better charge control and reduced dot-spreading. Third, as noted above, pure nitrogen has been identified as a suitable gas to inhibit negative ions and to enchance electron charge current amplitude. By displacing oxygen, this nitrogen may also be expected to reduce oxidation or corrosion of the printhead, thus reducing a major factor in printhead wear.

Finally, the operation to produce a highly quantized step-charge, and the discovery that the highly controllable electron species is responsible for that charge, permits one to define precise charge quanta on the dielectric imaging member by simple gating voltages synchronized with the RF burst. The ability to form quantized charge dots, and to deposit positive or negative charge, enables the formation of latent images suitable for grey scale or multicolor toning and printing.

This completes a description of applicant's invention and representative methods of implementation, which has been described for clarity of illustration, primarily by reference to modifications of existing structures and their modes of operation. The invention being thus disclosed, numerous applications and particular embodiments modeled on related devices and technology will occur to those skilled in electrographic imaging, as equivalents, modifications and variations of the invention, and these are considered to be within the scope of the invention as set forth in the claims appended hereto.

What is claimed is:

1. A method of providing a controlled charge to a point region of a separate member for forming a latent charge image for forming a visible image, such method comprising the steps of (A) providing an array of controllable electrode assemblies for generating charged particles, each assembly including means for forming a charge breakdown region and means for extracting a directed packet of charged particles from said charge breakdown region, each assembly of said array being sized and located to define when actuated a point charge region on said separate member, and (B) controlling said array to preferentially provide extracted negatively charged particles in said packet wherein said particles have a substantially uniform mass $m_o$.

2. The method of claim 1, wherein the step of controlling includes controlling an electrode assembly such that said mass is the mass $m_e$ of an electron.

3. The method of claim 2, wherein the step of controlling includes the step of providing a non-electron attaching gas in a region of said array for inhibiting formation of negative ions.

4. The method of claim 2, wherein the step of controlling includes the step of applying an RF excitation signal for forming said charge breakdown region, and applying an electrostatic extraction potential for accelerating charged particles from said charge breakdown region, wherein the period of said RF signal is a time interval selected in relation to a characteristic negative ion mobility, which is effective to inhibit extraction of negative ions from said region.

5. The method of claim 4, wherein said time interval is less than approximately several hundred nanoseconds.

6. The method of claim 2, further comprising the step of providing an electron attaching gas to a region outside of the array of electrode assemblies to convert electrons to ions for delivery of charge to the separate member.

7. The method of claim 1, wherein the step of controlling includes the step of providing an electron attaching gas in a region of said array for absorbing electrons so that the charge reaching said separate member is carried substantially by negative ions.

8. The method of claim 1, wherein the step of controlling said array includes the steps of (i) controlling said array to provide negatively charged particles of two types, a first type having a mass substantially equal to a first mass $m_o$ and a second type having a mass substantially equal to $m_l$, and (ii) affecting travel of the particles of mass $m_l$ so that only said particles of mass $m_o$ are directed at said member.

9. The method of claim 8, wherein said step of affecting travel is effected by applying an electrostatic potential.

10. The method of claim 9, wherein said charge breakdown region is formed by an RF excitation signal, and wherein said electrostatic potential is applied with a phase delay corresponding to the mobility of one of said two types of particles.

11. The method of claim 10, wherein said electrostatic potential is applied to develop a quantized charge on said separate member.

12. The method of claim 8, wherein said step of affecting travel is effected by applying a magnetic field.

13. The method of claim 8, wherein said step of affecting travel is effected by directing a stream of gas across said array.

14. The method of claim 1, wherein said charged particles are electrons and each assembly of said array is controlled to provide no more than five packets of electrons.

15. The method of claim 14, wherein an electrode assembly of said array is controlled to operate in dry nitrogen to produce a single electron spike for printing a charge dot.

16. The method of claim 1, wherein said charged particles are electrons and each assembly of said array is controlled to deposit a charge of between approximately one and approximately five picoCoulombs.

17. The method of claim 1, further comprising the step of actuating an assembly of the array by gating voltages synchronized with an RF burst to deposit precise charge quanta on the separate member.

18. A method of providing a controlled charge to a point region of a separate member for forming a latent charge image for developing a visible image, such method comprising the steps of (A) providing an array of controllable electrode assemblies for generating charged particles, each assembly including means for forming a charge breakdown region and means for extracting a directed packet of charged particles from said charge breakdown region, each assembly of said array being sized and located to define when actuated a point charge region on said separate member, and (B) applying to said breakdown region RF signal bursts sufficiently close together to provide charge seeding so that substantially uniform directed packets are extracted without misfires.

19. The method of claim 18, wherein the means for extracting includes biasing electrodes and the method includes controlling a signal applied to a biasing electrode in phased relation to a portion of a said RF signal burst.

20. A method of providing a controlled charge to a point region of a separate member for forming a latent charge image for developing a visible image, such method comprising the steps of (A) providing an array of controllable electrode assemblies for generating charged particles, each assembly including means for forming a charge breakdown region and means for extracting a directed packet of negatively charged particles from said charge breakdown region, each assembly of said array being sized and located to define when actuated a point charge region on said separate member, and (B) applying to said means for forming a charge breakdown region an RF signal of sufficiently high frequency to substantially inhibit ions generated in said charge breakdown region from travelling therefrom, so that the charged particles extracted therefrom are electrons.

21. The method of claim 20, wherein an electrode assembly of said array is controlled to operate in dry nitrogen to produce electrons which transport a charge of approximately five picoCoulombs.

22. A method of providing a controlled charge to a point region of a separate member for forming a latent charge image for developing a visible image, such method comprising the steps of (A) providing an array of controllable electrode assemblies for generating charged particles, each assembly including means for developing a charge breakdown region and means for extracting a directed packet of negatively charged particles from said charge breakdown region, each assembly of said array being sized and located to define when actuated a point charge region on said separate member, and (B) applying a flow of non-electron attaching gas about said charge breakdown region to inhibit formation of negative ions, so that the charged particles extracted therefrom are electrons.

23. The method of claim 22, further comprising the step of controlling extraction of the electrons by gating voltages synchronized with an RF actuation signal to deposit quantized negative charge dots forming the latent charge image.

24. The method of claim 23, further comprising the step of, in an additional operating cycle, controlling the electrode assemblies to deposit positive ions thereby achieving a range of charge levels in the latent image for multicolor or grey scale printing.

25. A method of printing with an ionographic printer of the type wherein an array of electrode structures are provided opposite a dielectric member, each electrode structure of the array including a first electrode set for generating a charge breakdown region and a second electrode set for extracting charge carriers from said charge breakdown region and depositing charge on the dielectric member, wherein said second electrode set is maintained at a negative potentional with respect to said dielectric member, and said array is operated to inhibit ions so that electrons deposit said charge on the dielectric member.

26. The method of claim 25, wherein the array is operated to inhibit ions by providing a flow of nitrogen to said charge breakdown region.

27. The method of claim 25, wherein the dielectric member is operated at a transport speed of over one hundred pages per minute.

28. The method of claim 25, wherein the first electrode set is actuated with an RF signal of under 0.2 microsecond period.

* * * * *